United States Patent
Zhang et al.

(10) Patent No.: US 10,477,214 B2
(45) Date of Patent: Nov. 12, 2019

(54) METHOD AND APPARATUS FOR SCALING PARAMETER CODING FOR INTER-COMPONENT RESIDUAL PREDICTION

(71) Applicant: HFI Innovation Inc., Zhubei, Hsinchu County (TW)

(72) Inventors: Xianguo Zhang, Beijing (CN); Kai Zhang, Beijing (CN); Jicheng An, Beijing (CN)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 15/107,909

(22) PCT Filed: Dec. 16, 2014

(86) PCT No.: PCT/CN2014/093917
§ 371 (c)(1),
(2) Date: Jun. 23, 2016

(87) PCT Pub. No.: WO2015/101173
PCT Pub. Date: Jul. 9, 2015

(65) Prior Publication Data
US 2016/0323581 A1    Nov. 3, 2016

Related U.S. Application Data

(63) Continuation-in-part of application No. PCT/CN2013/090836, filed on Dec. 30, 2013.

(51) Int. Cl.
*H04N 19/13* (2014.01)
*H04N 19/463* (2014.01)
(Continued)

(52) U.S. Cl.
CPC ........... *H04N 19/13* (2014.11); *H04N 19/159* (2014.11); *H04N 19/186* (2014.11);
(Continued)

(58) Field of Classification Search
None
See application file for complete search history.

(56) References Cited

U.S. PATENT DOCUMENTS 4,626,894 A * 12/1986 Harwood ............... H04N 9/646
348/607
8,873,624 B2   10/2014 Schwarz et al.
(Continued)

FOREIGN PATENT DOCUMENTS

CN    101044762    9/2007
CN    101160970    4/2008
(Continued)

OTHER PUBLICATIONS

Zhang, X., et al.; "AHG5 and AHG8: Alpha parameter coding methods for inter-component residual prediction in HEVC range extension;" Joint Collaborative Team on Video Coding (JCT-VC) of ITU-T SG16 WP3 and ISO/IEC JTC1/SC29/WG11; Jan. 2014; pp. 1-6.
(Continued)

*Primary Examiner* — Michael J Hess
(74) *Attorney, Agent, or Firm* — Wolf, Greenfield & Sacks, P.C.

(57) ABSTRACT

A method for inter-color residual prediction using an improved scaling parameter coding is disclosed. In one embodiment, a scaling parameter is used for inter-color residual prediction between a first color component and a second color component. The scaling parameter is coded using context-based coding having the same number of context models as the longest binary code for the absolute values of the scaling parameter. For example, when the first scaling parameter is selected from a group consisting of 8, 4, 2, 1, 0, −1, −2 −4 and −8, the absolute values of the scaling parameter can be represented by binary codes with the longest binary code having 4 bits. The context-based coding
(Continued)

for the absolute scaling parameter also uses 4 context models. In a second embodiment, the scaling parameter is coded using binary codes by assigning a shorter binary code to a larger non-zero scaling parameter.

17 Claims, 3 Drawing Sheets

(51) Int. Cl.
    *H04N 19/186*    (2014.01)
    *H04N 19/159*    (2014.01)
    *H04N 19/196*    (2014.01)
    *H04N 19/91*    (2014.01)

(52) U.S. Cl.
    CPC ......... *H04N 19/196* (2014.11); *H04N 19/463* (2014.11); *H04N 19/91* (2014.11)

(56) References Cited

U.S. PATENT DOCUMENTS

| | | | |
|---|---|---|---|
| 9,351,006 B2 | 5/2016 | Kim et al. | |
| 2005/0053146 A1 | 3/2005 | Mukerjee | |
| 2007/0230564 A1 | 10/2007 | Chen et al. | |
| 2008/0175495 A1 | 7/2008 | Segall | |
| 2012/0230402 A1* | 9/2012 | Auyeung | H04N 19/176 375/240.12 |
| 2012/0250769 A1 | 10/2012 | Bross et al. | |
| 2013/0170553 A1* | 7/2013 | Chen | H04N 19/52 375/240.16 |
| 2013/0188688 A1* | 7/2013 | Panusopone | H04N 19/13 375/240.02 |
| 2014/0140400 A1* | 5/2014 | George | H04N 19/52 375/240.12 |
| 2014/0369426 A1* | 12/2014 | Li | H04N 19/46 375/240.29 |
| 2015/0016512 A1* | 1/2015 | Pu | H04N 19/176 375/240.03 |
| 2015/0117519 A1* | 4/2015 | Kim | H04N 19/136 375/240.02 |

FOREIGN PATENT DOCUMENTS

| | | |
|---|---|---|
| CN | 101411192 | 4/2009 |
| CN | 101459847 A | 6/2009 |
| CN | 101521013 A | 9/2009 |
| CN | 101848386 | 9/2010 |
| CN | 102726043 | 10/2012 |
| CN | 103139565 A | 6/2013 |
| CN | 103210647 A | 7/2013 |
| EP | 2428042 A1 | 3/2012 |
| WO | WO 2010/127692 A1 | 11/2010 |
| WO | WO 2015/100522 A1 | 7/2015 |

OTHER PUBLICATIONS

Lai, P.L., et al.; "Description of screen content coding technology proposal by MediaTek;" Joint Collaborative Team on Video Coding (JCT-VC) of ITU-T SG16 WP3 and ISO/IEC JTC1/SC29/WG11; Mar.-Apr. 2014; pp. 1-32.

Rosewarne, C., et al.; "HEVC Range extensions test model 6 encoder description;" Joint Collaborative Team on Video Coding (JCT-VC) of ITU-T SG16 WP3 and ISO/IEC JTC1/SC29/WG11; Jan. 2014; pp. 1-20.

Flynn, D., et al.; "High Efficiency Video Coding (HEVC) Range Extensions text specification: Draft 6;" Joint collaborative Team on Video Coding (JCT-VC) of ITU-T SG16 WP3 and ISO/IEC JTC1/SC291WG11; Jan. 2014; pp. 1-358.

FLynn, D., et al.; "High Efficiency Video Coding (HEVC) Range Extensions text specification: Draft 5;" Joint collaborative Team on Video Coding (JCT-VC) of ITU-T SG16 WP3 and ISO/IEC JTC1/SC29/WG11; Apr. 2013; pp. 1-342.

International Search Report dated Mar. 18, 2015, issued in application No. PCT/CN2014/093917.

Pu, W., et al.; "Non RCE1 Inter Color Component Residual Prediction;" Joint Collaborative Team on Video Coding (JCT-VC) of ITU-T SG 16 WP 3 and ISO/IEC JTC 1/SC 29/ WG 11; Jul.-Aug. 2013; pp. 1-7.

Marpe, D., et al; "Context-Based Adaptive Binary Arithmetic Coding in The H.264/AVC Video Standard;" IEEE Transactions on Circuits and Systems for Video Technology; vol. 13; No. 7; Jul. 2003; pp. 620-636.

International Search Report and Written Opinion dated Sep. 26, 2014 in connection with International Application No. PCT/CN2013/090836.

Written Opinion dated Mar. 18, 2015 in connection with International Application No. PCT/CN2014/093917.

* cited by examiner

METHOD AND APPARATUS FOR SCALING PARAMETER CODING FOR INTER-COMPONENT RESIDUAL PREDICTION

CROSS REFERENCE TO RELATED APPLICATIONS

This Application is a national stage filing under 35 U.S.C. § 371 of International Patent Application Serial No. PCT/CN2014/093917, filed Dec. 16, 2014, which is a Continuation-in-Part of International Patent Application Serial No. PCT/CN2013/090836, filed Dec. 30, 2013. The entire contents of these applications are incorporated herein by reference in their entirety.

TECHNICAL FIELD

The present invention relates to palette coding for video data. In particular, the present invention relates to techniques to improve the performance of inter-component coding by using more efficient scaling parameter coding.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. A coding tool developed for RExt is inter-component prediction that improves coding efficiency particularly for multiple color components with high bit-depths. Inter-component prediction can exploit the redundancy among multiple color components and improves coding efficiency accordingly. A form of inter-component prediction being developed for RExt is Inter-component Residual Prediction (IRP) as disclosed by Pu et al. in JCTVC-N0266, ("*Non-RCE1: Inter Color Component Residual Prediction*", in Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0266).

In Inter-component Residual Prediction, the chroma residual is predicted at the encoder side as:

$$r_C'(x,y) = r_C(x,y) - (\alpha \times r_L(x,y)) >> 3 \quad (1)$$

In equation (1), $r_C(x, y)$ denotes the final chroma reconstructed residual sample at position (x, y), $r_C'(x,y)$ denotes the reconstructed chroma residual sample from the bitstream at position (x, y), $r_L(x, y)$ denotes the reconstructed residual sample in the luma component at position (x,y) and α is a scaling parameter (also called alpha parameter, or scaling factor). Scaling parameter α is calculated at the encoder side and signaled. At the decoder side, the final chroma reconstructed residual sample is derived according to:

$$r_C(x,y) = r_C'(x,y) + (\alpha \times r_L(x,y)) >> 3 \quad (2)$$

While the YUV format is used as an example to illustrate inter-component residual prediction derivation, any other color format may be used. For example, RGB format may be used. If R component is encoded first, R component is treated the same way as the luma component in the above example. Similarly, if G component is encoded first, the G component is treated the same way as the luma component.

An exemplary decoding process the IRP in the current HEVC-REXT is illustrated in FIG. 1 for transform units (TUs) of the current unit (CU). The decoded coefficients of all TUs of a current CU are provided to processors for respective components. For the first component (e.g., Y component), the decoded transform coefficients are inverse transformed (block 110) to recover the Intra/Inter coded residual of the first color component. The Inter/Intra coded first color component is then processed by First Component Inter/Intra Compensation 120 to produce the final reconstructed first component. The needed Inter/Intra reference samples for First Component Inter/Intra Compensation 120 are provided from buffers or memories. In FIG. 1, it implies that the first color component is Inter/Intra coded so that the Inter/Intra compensation is used to reconstruct the first component from the reconstructed residual. However, other coding process (e.g., inter-view prediction) may also be included to generate first component residual. For the second color component, the decoded transform coefficients are decoded using second component decoding process (block 112) to recover inter-component coded second component. Since the second component is inter-component residual predicted based on the first component residual, Inter-component Prediction for second Component (block 122) is used to reconstruct the second component residual based on outputs from block 110 and block 112. As mentioned before, the inter-component residual prediction needs the scaling parameter coded. Therefore, decoded alpha parameter between the first color component and the second color component is provided to block 122. The output from block 122 corresponds to Inter/Intra prediction residual of the second component. Therefore, second Component Inter/Intra Compensation (block 132) is used to reconstruct the final second component. Similar to the first color component, other coding process (e.g., inter-view prediction) may also be included in the coding/prediction process to generate the second color residual. For the third component, similar processing can be used (i.e., blocks 114, 124 and 134) to reconstruct the final third component. According to the decoding process, the encoding process can be easily derived.

The coding process for inter-component residual prediction may be applied to video in YUV format which contains 1 luma and 2 chroma components at the ratio of 4:4:4 for example. The coding process for inter-component residual prediction may also be applied to video with R, G, and B components or other formats. The first encoded component can be treated as the luma component and the other two components can be treated as two chroma components. For RGB format, any color can be selected as the first color.

As shown in equations (1) and (2), derivation of predicted residual for the second or third color component relies on the first component (or the luma component) residual and an alpha parameter. The alpha parameter is transmitted in the transform unit of the video stream. The luma residual is multiplied by the alpha parameter and right shifted by 3 bits as shown in equations (1) and (2). The scaled residual is utilized as the predicted residual for the current component transform block (TB) residuals. According to the existing RExt draft standard, an alpha value is selected are among −8, −4, −2, −1, 0, 1, 2, 4 and 8.

Furthermore, the alpha parameter is transmitted in the bitstream by converting the absolute value of the alpha parameter into a binary representation as shown in Table 1. In the binarization of absolute alpha value, Table 1 shows the binary codes from shortest to longest code corresponding to the smallest absolute value to the largest absolution value. The bits of the absolute alpha value along with a sign flag indicating a positive or negative value are coded using context based entropy coding. According to the existing RExt draft standard, the first three bins of the binary codes are used to form three independent context models. In other words, absolute alpha values 8 and 4 share a common context model. Furthermore, a smaller absolute alpha value is assigned a shorted binary code according to Table 1.

TABLE 1

| abs(alpha) | Binary codes |
| --- | --- |
| 0 | 0 |
| 1 | 10 |
| 2 | 110 |
| 4 | 1110 |
| 8 | 1111 |

It is desirable to develop methods for further improving the coding efficiency and/or reducing the complexity associated with the coding process for the alpha parameter.

SUMMARY

A method for inter-color residual prediction using an improved scaling parameter coding is disclosed. In one embodiment, a first scaling parameter is used for inter-color residual prediction between a first color and a second color. The first scaling parameter can be coded using first context-based coding having a first number of context models equal to a longest binary code for absolute values of the first scaling parameter. For example, when the first scaling parameter is selected from a group consisting of 8, 4, 2, 1, 0, −1, −2 −4 and −8, the absolute values of the first scaling parameter can be represented by binary codes with the longest binary code having 4 bits. The context-based coding for the absolute first scaling parameter according to the embodiment of the present invention uses 4 context models. The system may further include a third color component. A second scaling parameter is used for inter-color residual prediction between the first color and the third color. The second scaling parameter can be coded using second context-based coding having a second number of context models equal to a longest second binary code for absolute values of the second scaling parameter.

In a second embodiment, the first scaling parameter is coded using binary codes by assigning any first binary code for a first non-zero first scaling parameter with a code length not longer than any second binary code for a second non-zero first scaling parameter if the first non-zero first scaling parameter is larger than the second non-zero first scaling parameter. A flag can be used to indicate whether to use this first scaling parameter coding process or a different first scaling parameter coding process. The flag can be incorporated in a sequence parameter set (SPS), picture parameter set (PPS) or coding tree unit (CTU) level of the bitstream. The first scaling parameter can be selected from a group consisting of 8, 4, 2, 1, 0, −1, −2, −4 and −8. For this set of first scaling parameter values, the binary codes can be further coded using context-based coding with 5 context models for the first scaling parameter values 8, 4, 2, 1 and 0, and using 2-bit fixed length codes for first scaling parameter values −1, −2, −4 and −8.

DETAILED DESCRIPTION

Figure 1:
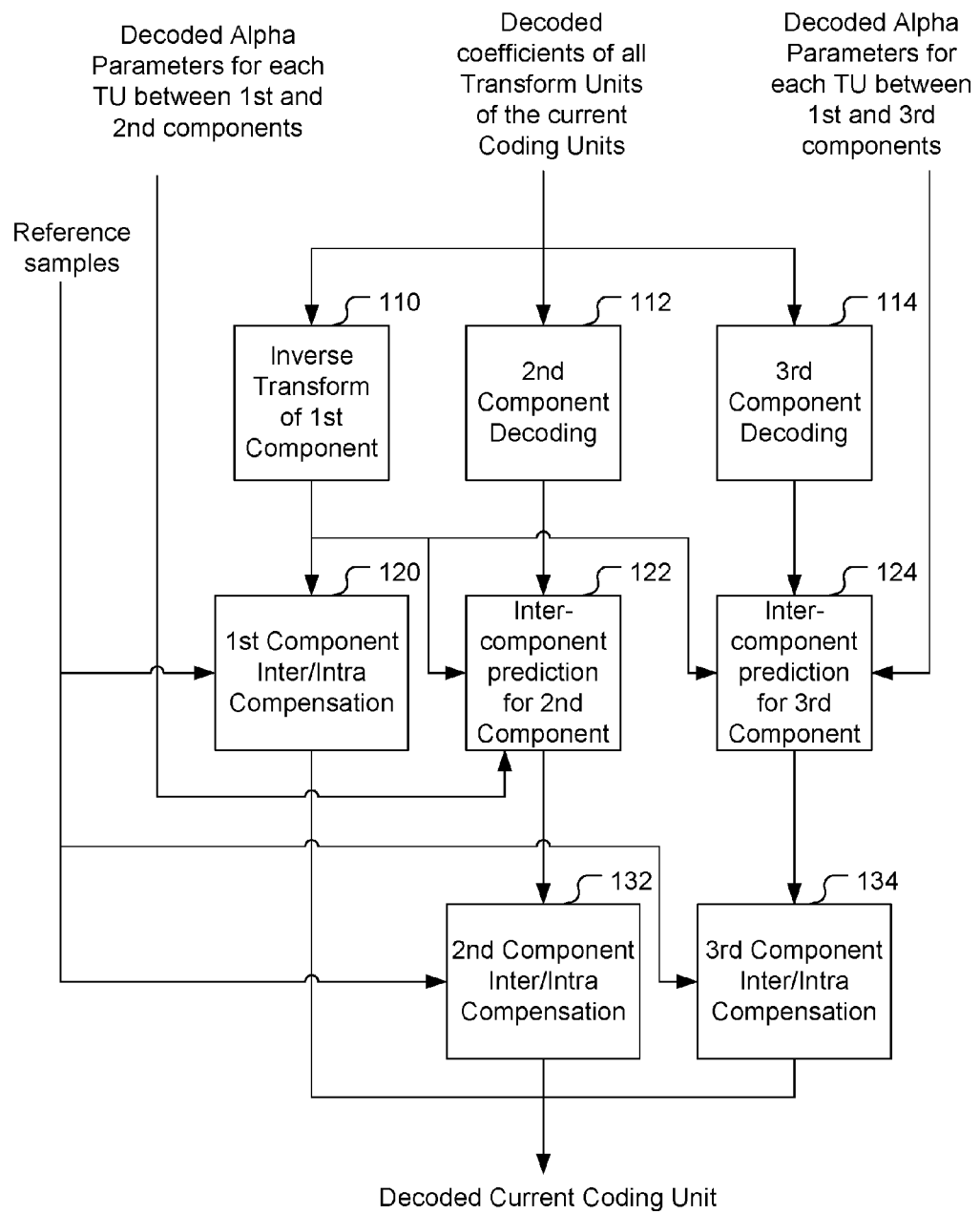
FIG. 1 illustrates an example of decoder system block diagram for inter-color residual prediction (IRP) according to existing HEVC-RExt (High Efficiency Video Coding-Range Extension).

As mentioned above, the existing draft RExt standard uses the binary codes from shortest to longest code for the smallest absolute value to the largest absolution value. The inter-component residual prediction (IRP) according to the existing draft RExt standard further uses three context models for alpha parameter coding. In this case, each bin of the first three bins of the alpha binary codes corresponds to one independent context model. In other words, the absolute alpha values 4 and 8 share a same context model.

According to a study associated with the present invention, it is observed that the absolute alpha values 4 and 8 occur more frequent than other absolute alpha values. However, the existing draft RExt standard not only assigned longer binary codes to these two popular absolute alpha values, but also uses a shared context model for these two absolute alpha values. Therefore, the existing draft RExt standard may suffer performance degradation due to such alpha parameter coding. Accordingly improved alpha parameter coding is disclosed as follows.

First Embodiment. In the first embodiment of the present invention, the absolute alpha values are context adaptive coded using 4 context models for 4 bins of the binary codes in Table 1. Therefore, absolute alpha values 4 and 8 can have separate contexts and the coding efficiency can be improved for both YUV and RGB formats. While a specific example is illustrated to use 4 bins for 4 context models, the present invention is not limited to 4 bins for context models. An embodiment of the present invention uses the number of bins associated with the longest binary code as the number of context models. In other words, each bin of the binary codes for the absolute alpha values corresponds to one independent context model.

The inter-color prediction between the third color component and the first color component may use a same alpha parameter or an individual alpha parameter from the alpha parameter for the first color component and the second color component. If an individual scaling parameter is used for the third color component and the first color component, the individual scaling parameter may be coded using the scaling parameter coding as disclosed in the first embodiment.

Second Embodiment. In the second embodiment of the present invention, a shorter binary code is assigned to a non-zero alpha parameter having a larger value. An example of binary codes for the non-zero alpha parameter values 8, 4, 2, 1, −1, −2, −4 and −8 are shown in Table 2, where 0 is assigned the shortest code, i.e., 0.

TABLE 2

| Alpha | Binary codes |
|-------|--------------|
| 0     | 0            |
| 8     | 10           |
| 4     | 110          |
| 2     | 1110         |
| 1     | 11110        |
| −1    | 111110       |
| −2    | 1111110      |
| −4    | 11111110     |
| −8    | 11111111     |

Furthermore, the binary codes of the alpha parameter values can be coded using context based coding. For example, 5 bins may be used for 5 independent context models for alpha parameters 0, 8, 4, 2, and 1. The remaining alpha parameters −1, −2, −4 and −8 can be fixed-length coded using 2 bits. An example is illustrated in Table 3.

TABLE 3

| Alpha | log2_res_scale_pred_4minus [c] | log2_res_scale_neg [c] |
|-------|-------------------------------|-----------------------|
| 0     | 0(0)                          | Na                    |
| 8     | 1(10)                         | Na                    |
| 4     | 2(110)                        | Na                    |
| 2     | 3(1110)                       | Na                    |
| 1     | 4(11110)                      | Na                    |
| −1    | 5(11111)                      | 0(00)                 |
| −2    | 5(11111)                      | 1(01)                 |
| −4    | 5(11111)                      | 2(10)                 |
| −8    | 5(11111)                      | 3(11)                 |

In Table 3, syntax log 2_res_scale_pred_4minus[c] corresponds to the bins for independent context models and syntax log 2_res_scale_neg [c] corresponds to the 2-bit fixed-length codes for the negative alpha values.

The inter-color prediction between the third color component and the first color component may use a same alpha parameter or an individual alpha parameter from the alpha parameter for the first color component and the second color component. If an individual scaling parameter is used for the third color component and the first color component, the individual scaling parameter may be coded using the scaling parameter coding as disclosed in the first embodiment.

Furthermore, the first embodiment, the second embodiment, or both the first embodiment and the second embodiment may be adaptively enabled or disables. For example, a flag adaptive_alpha_coding_flag may be used to adaptively enable or disable the use of binary codes according to the second embodiment. If the flag adaptive_alpha_coding_flag has a value of 1, the new binary codes (e.g., Table 2) are used, where a shorter binary code is assigned to a non-zero alpha parameter having a larger value. If the flag adaptive_alpha_coding_flag has a value of 0, the existing binary codes (e.g., Table 1) are used. In the case that the existing binary codes are used, either the existing context models or the new context models according to the first embodiment can be used. The flag adaptive_alpha_coding_flag may be signaled in a sequence parameter set (SPS), picture parameter set (PPS) or coding tree unit (CTU) level.

In order to reduce the transmitted data associated with the alpha parameter, another embodiment according to the present invention uses alpha parameter prediction to code current alpha parameters. Therefore, only the differences between the current alpha parameters and the alpha parameter predictors need to be transmitted. When the difference is 0, an indication can be signaled or a zero value may be transmitted. The alpha parameter prediction can be derived from the alpha parameters of neighboring blocks. The use of neighboring blocks for alpha parameter prediction can be signaled using an alpha parameter prediction flag in the coding tree unit (CTU), coding unit (CU) or transform tree or transform unit (TU) level.

The performance of a coding system incorporating the first embodiment of the present invention is compared to an anchor system. Both systems use the binary codes as shown in Table 1. However, the system incorporating the first embodiment uses 4 context models while the anchor system uses 3 context models. The comparison results of BD-rate reductions are summarized in Table 4 for different test material (AHG8 YUV, AHG8 RGB, AHG5 YUV and AHG5 RGB), where a positive value indicates the embodiment results in improved performance. Different coding configurations including All Intra (AI), Random Access (RA) and Low-delay B frame are used for comparison. The BD-rate is a well-known performance measure in the field of video coding. As shown in Table 4, the embodiment of the present invention often results in improved performance. The largest improvement reaches 1.2%.

TABLE 4

|           | AI          | RA           | LB            |
|-----------|-------------|--------------|---------------|
| AHG8 YUV  | 0.1~0.3%    | 0.1~0.3%     | 0.1~1.2%      |
| AHG8 RGB  | 0.2~0.4%    | −0.1~0.4%    | 0.1~1.0%      |
| AHG5 YUV  | 0.02~0.05%  | −0.08~0.12%  | −0.04~0.25%   |
| AHG5 RGB  | 0.1~0.5%    | 0.2~0.6%     | 0.3~0.9%      |

The performance of a coding system incorporating both the first embodiment and the second embodiment of the present invention is compared to an anchor system, where a flag is incorporated in the picture parameter set (PPS) to select either the first embodiment or the second embodiment. In particular, the flag select the second embodiment for the RGB test materials and selects the first embodiment for the YUV test materials. The anchor system is the same as before. The comparison results of BD-rate reductions are summarized in Table 5 for different test material (AHG8 YUV, AHG8 RGB, AHG5 YUV and AHG5 RGB). As shown in Table 5, the embodiment of the present invention often results in improved performance. The largest improvement reaches 1.8%.

TABLE 5

|           | AI          | RA           | LB            |
|-----------|-------------|--------------|---------------|
| AHG8 YUV  | 0.1~0.3%    | 0.1~0.3%     | 0.1~1.2%      |
| AHG8 RGB  | 0.1~0.8%    | 0.3~0.7%     | 0.1~1.8%      |
| AHG5 YUV  | 0.02~0.05%  | −0.08~0.12%  | −0.04~0.25%   |
| AHG5 RGB  | 0.1~0.5%    | 0.3~0.8%     | 0.4~1.1%      |

Figure 2:
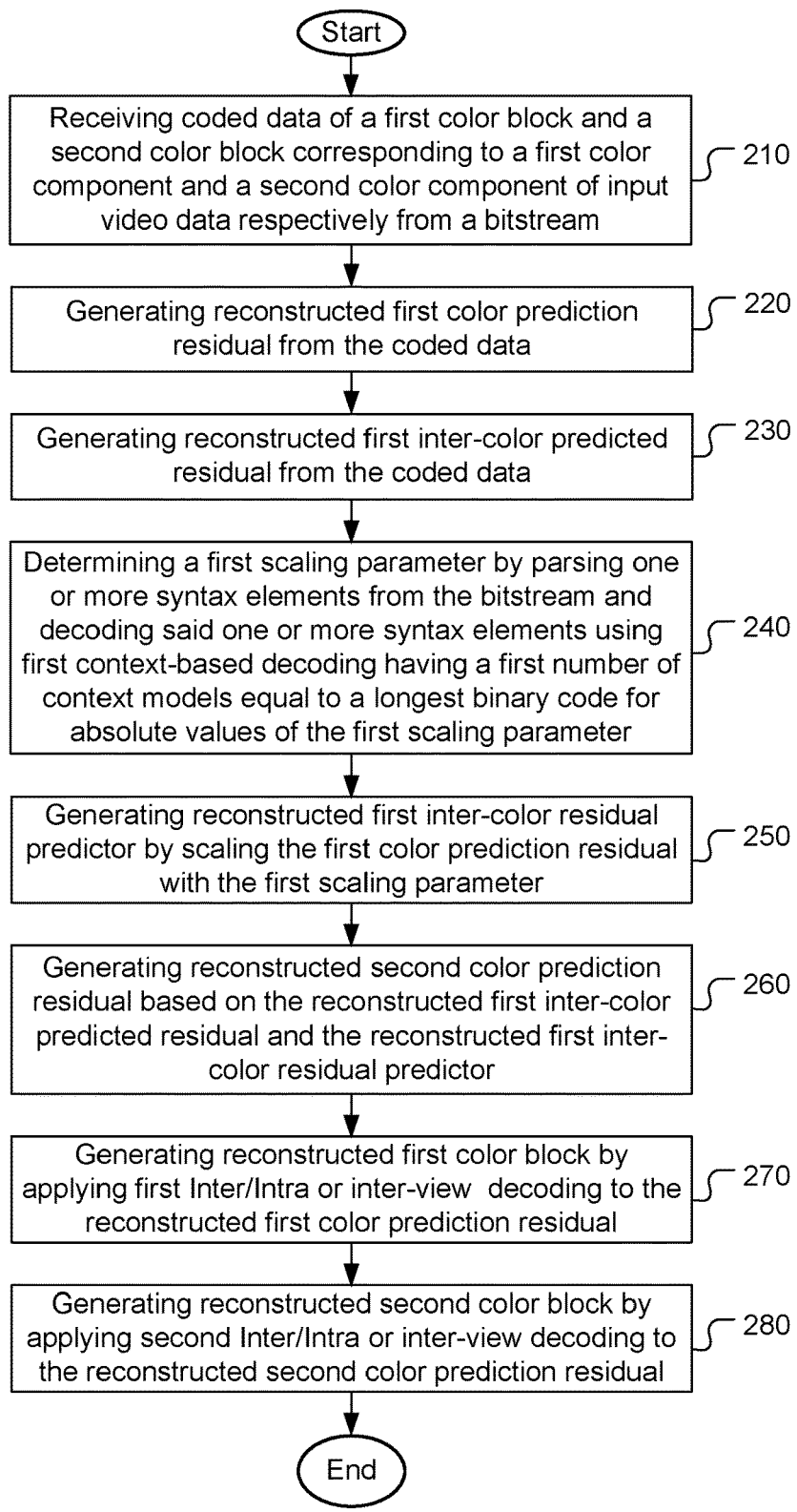
FIG. 2 illustrates an exemplary flowchart of a system for inter-color residual prediction using improved scaling parameter coding according to an embodiment of the present invention.

FIG. 2 illustrates an exemplary flowchart of a decoder system using improved scaling parameter coding for inter-color residual prediction according to an embodiment of the present invention. The scaling parameter according to this embodiment uses context-based coding having the same number of context models as the longest binary code for absolute values of the scaling parameter. The system receives coded data of a first color block and a second color block corresponding to a first color component and a second color component of input video data respectively from a bitstream as shown in step 210. The coded data may be retrieved from memory (e.g., computer memory, buffer (RAM or DRAM) or other media) or from a processor. The reconstructed first color prediction residual is generated from the coded data in step 220. The reconstructed first inter-color predicted residual is generated from the coded data in step 230. A first scaling parameter is determined by parsing one or more syntax elements from the bitstream and decoding said one or more syntax elements using first context-based decoding having a first number of context models equal to a longest binary code for absolute values of the first scaling parameter in step 240. The first inter-color residual predictor is generated by scaling the first color prediction residual with the first scaling parameter in step 250. The second color prediction residual is generated based on the reconstructed first inter-color predicted residual and the first inter-color residual predictor in step 260. The reconstructed first color block is generated by applying first Inter/Intra or inter-view decoding to the reconstructed first color prediction residual in step 270. The second color block is generated by applying second Inter/Intra or inter-view decoding to the reconstructed second color prediction residual in step 280.

Figure 3:
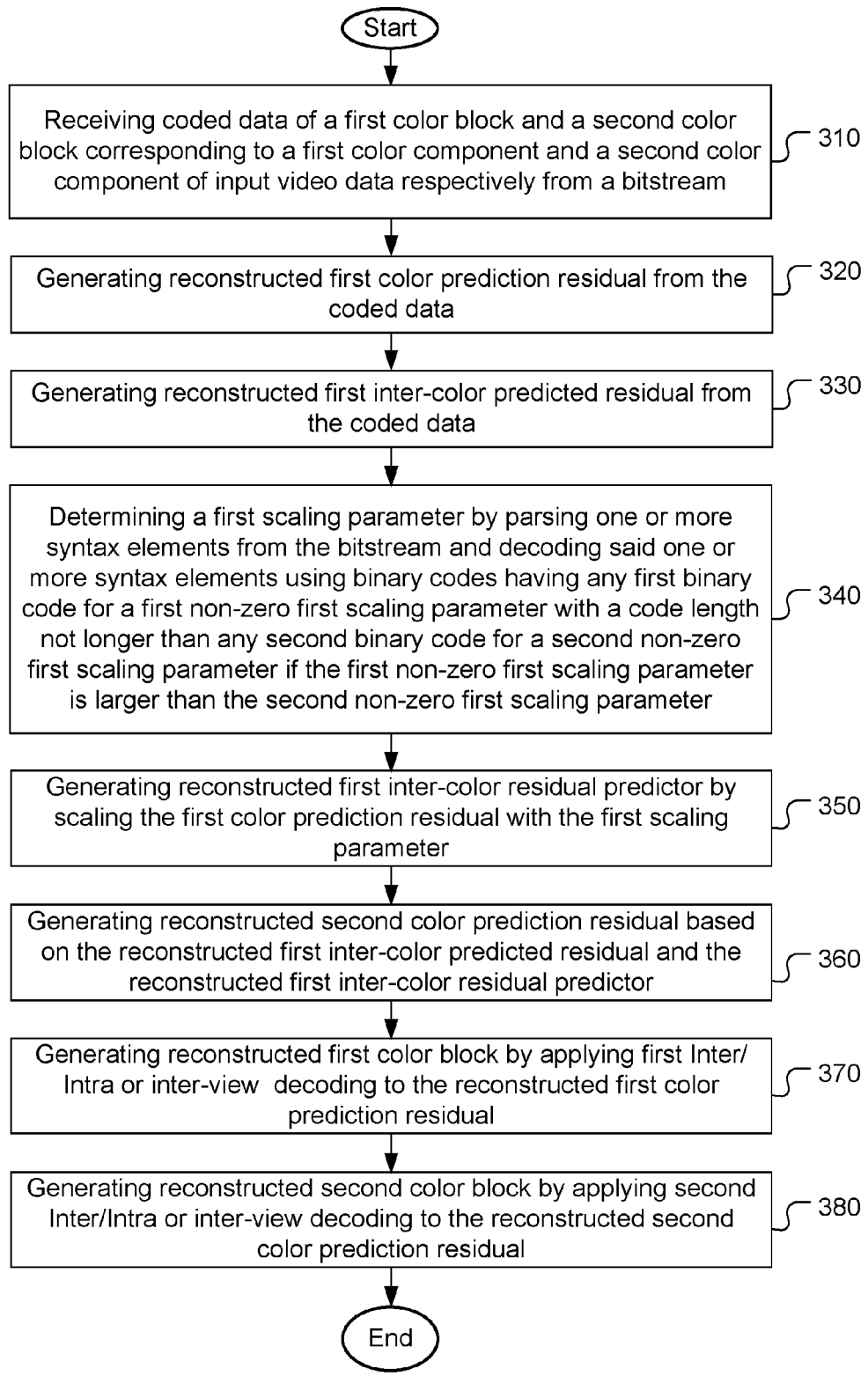
FIG. 3 illustrates an exemplary flowchart of a system for inter-color residual prediction using improved scaling parameter coding according to another embodiment of the present invention.

FIG. 3 illustrates an exemplary flowchart of a decoder system using improved scaling parameter coding for inter-color residual prediction according to another embodiment of the present invention. The scaling parameter according to this embodiment uses binary codes, where a shorter binary code is assigned to a larger non-zero scaling parameter. The system receives coded data of a first color block and a second color block corresponding to a first color component and a second color component of input video data respectively from a bitstream as shown in step 310. The reconstructed first color prediction residual is generated from the coded data in step 320. The reconstructed first inter-color predicted residual is generated from the coded data in step 330. A first scaling parameter is determined by parsing one or more syntax elements from the bitstream and decoding said one or more syntax elements using binary codes having any first binary code for a first non-zero first scaling parameter with a code length not longer than any second binary code for a second non-zero first scaling parameter if the first non-zero first scaling parameter is larger than the second non-zero first scaling parameter in step 340. The first inter-color residual predictor is generated by scaling the first color prediction residual with the first scaling parameter in step 350. The second color prediction residual is generated based on the reconstructed first inter-color predicted residual and the first inter-color residual predictor in step 360. The reconstructed first color block is generated by applying first Inter/Intra or inter-view decoding to the reconstructed first color prediction residual in step 370. The second color block is generated by applying second Inter/Intra or inter-view decoding to the reconstructed second color prediction residual in step 380.

The flowcharts shown are intended to illustrate an example of inter-color residual prediction according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of inter-component residual prediction for a video decoder system, the method comprising:
   receiving coded data of a first color block and a second color block corresponding to a first color component and a second color component of input video data respectively from a bitstream;
   generating reconstructed first color prediction residual from the coded data;
   generating reconstructed first inter-color predicted residual from the coded data;
   determining a first scaling parameter by parsing one or more syntax elements from the bitstream and performing a first context-based decoding on said one or more syntax elements by using separate context models for each bin of absolute values of the first scaling parameter, wherein a first number of context models used by the first context-based decoding is equal to a number of bins of a longest binary code for the absolute values of the first scaling parameter;

generating reconstructed first inter-color residual predictor by scaling the first color prediction residual with the first scaling parameter;

generating reconstructed second color prediction residual based on the reconstructed first inter-color predicted residual and the reconstructed first inter-color residual predictor;

generating reconstructed first color block by applying first Inter/Intra or inter-view decoding to the reconstructed first color prediction residual; and generating reconstructed second color block by applying second Inter/Intra or inter-view decoding to the reconstructed second color prediction residual.

2. The method of claim 1, wherein the absolute values of the first scaling parameter consist of 8, 4, 2, 1 and 0, and the first number of context models is equal to 4.

3. The method of claim 1 further comprising parsing a flag in the bitstream indicating whether the first scaling parameter is predicted using a neighboring first scaling parameter associated with one or more neighboring first blocks.

4. The method of claim 1 further comprising:

receiving second coded data of a third color block corresponding to a third color component of the input video data from the bitstream;

generating reconstructed second inter-color predicted residual from the coded data;

determining a second scaling parameter by parsing one or more second syntax elements from the bitstream and decoding said one or more second syntax elements using second context-based decoding having a second number of context models equal to a longest second binary code for the absolute values of the second scaling parameter;

generating second inter-color residual predictor by scaling the first color prediction residual with the second scaling parameter;

generating reconstructed third color prediction residual based on the reconstructed second inter-color predicted residual and the second inter-color residual predictor; and generating reconstructed third color block by applying third Inter/Intra or inter-view decoding to the reconstructed third color prediction residual.

5. The method of claim 4, further comprising parsing a flag in the bitstream to indicate whether the first scaling parameter is predicted using a neighboring first scaling parameter associated with one or more neighboring first block, and whether the second scaling parameter is predicted by the first scaling parameter.

6. A method of inter-component residual prediction for a video encoder system, the method comprising:

receiving input data of a first color block and a second color block corresponding to a first color component and a second color component of input video data respectively;

generating first color prediction residual by applying first Inter/Intra or inter-view encoding to the first color block;

generating second color prediction residual by applying second Inter/Intra or inter-view encoding to the second color block;

generating reconstructed first inter-color residual predictor by scaling the first color prediction residual with a first scaling parameter;

generating first inter-color predicted residual between the second color prediction residual and the reconstructed first inter-color residual predictor;

encoding the first scaling parameter using first context-based encoding by using separate context models for each bin of absolute values of the first scaling parameter, wherein a first number of context models used is equal to a number of bins of a longest binary code for the absolute values of the first scaling parameter;

providing the first scaling parameter encoded by the first context-based encoding; and providing the first inter-color predicted residual.

7. The method of claim 6 further comprising signaling a flag in a bitstream of the input video data to indicate whether the first scaling parameter is predicted using a neighboring first scaling parameter associated with one or more neighboring first blocks.

8. The method of claim 6 further comprising:

receiving second input data of a third color block corresponding to a third color component of the input video data;

generating third color prediction residual by applying third Inter/Intra or inter-view encoding to the third color block;

generating second inter-color residual predictor by scaling the first color prediction residual with a second scaling parameter;

generating second inter-color predicted residual between the third color prediction residual and the second inter-color residual predictor;

encoding the second scaling parameter using second context-based encoding having a second number of context models equal to a longest second binary code for the absolute values of the second scaling parameter;

providing the second scaling parameter encoded by the second context-based encoding; and providing the second inter-color predicted residual.

9. The method of claim 8, further comprising signaling a flag in a bitstream of the input video data to indicate whether the first scaling parameter is predicted using a neighboring first scaling parameter associated with one or more neighboring first block, and whether the second scaling parameter is predicted by the first scaling parameter.

10. The method of claim 4, wherein the decoding of said one or more second syntax elements further comprises using separate context models for each bin of the absolute values of the second scaling parameter.

11. The method of claim 8, wherein the encoding of the second scaling parameter further comprises using separate context models for each bin of the absolute values of the second scaling parameter.

12. The method of claim 1, wherein shorter non-zero binary codes are associated with larger absolute values of the first scaling parameter.

13. The method of claim 2, wherein an absolute value of the first scaling parameter of 8 is associated with a shortest non-zero binary code.

14. The method of clam 13, wherein an absolute value of the first scaling parameter of 4 is associated with a second shortest non-zero binary code.

15. The method of claim 6, wherein larger absolute values of the first scaling parameter are encoded using shorter non-zero binary codes.

16. The method of claim 6, wherein an absolute value of the first scaling parameter of 8 is associated with a shortest non-zero binary code.

17. The method of clam 16, wherein an absolute value of the first scaling parameter of 4 is associated with a second shortest non-zero binary code.

\* \* \* \* \*